United States Patent [19]
Caccini et al.

[11] Patent Number: 5,968,645
[45] Date of Patent: Oct. 19, 1999

[54] INORGANIC FIBRE MATERIAL

[75] Inventors: Gian Paolo Caccini, Villanova, Pa.; Guy Berthier; Jean-Luc Bernard, both of Clermont, France

[73] Assignee: Isover Saint-Gobain, Courbevoie, France

[21] Appl. No.: 08/857,888

[22] Filed: May 16, 1997

[30] Foreign Application Priority Data

Jul. 11, 1996 [FR] France .................................. 96/08707

[51] Int. Cl.$^6$ .................................. B32B 5/00; D02G 3/00
[52] U.S. Cl. .......................... 428/332; 428/369; 428/370; 428/373; 428/375; 428/378; 52/742.12; 52/742.13
[58] Field of Search ...................................... 428/364, 369, 428/370, 371, 373, 374, 375, 378, 391, 401, 332; 501/95; 65/438, 443, 447, 448, 450, 451; 442/330, 331, 332, 333, 334, 352, 353, 354, 355, 414, 415, 417; 52/742.12, 742.13, 404.1

[56] References Cited

U.S. PATENT DOCUMENTS

| | | | |
|---|---|---|---|
| 2,998,620 | 9/1961 | Stalego | 18/2.6 |
| 4,663,419 | 5/1987 | Fugier et al. | 528/164 |
| 4,710,406 | 12/1987 | Fugier et al. | 427/389.8 |
| 5,025,077 | 6/1991 | Tetart et al. | 528/86 |
| 5,047,452 | 9/1991 | Gicquel | 523/443 |
| 5,270,434 | 12/1993 | Tetart et al. | 528/164 |
| 5,431,992 | 7/1995 | Houpt et al. | 428/224 |
| 5,601,897 | 2/1997 | Vermilion et al. | 428/69 |
| 5,620,497 | 4/1997 | Aschenbeck et al. | 65/505 |
| 5,624,742 | 4/1997 | Babbitt et al. | 428/212 |
| 5,683,810 | 11/1997 | Babbitt et al. | 428/370 |

*Primary Examiner*—William Krynski
*Assistant Examiner*—Chris Cronin
*Attorney, Agent, or Firm*—David Bennett

[57] ABSTRACT

The invention relates to a material based on inorganic fibres at least a proportion of which are multicomponent fibres and the cohesion and/or the geometry of which is (are) ensured, at least partially, by a sizing.

It also relates to the use of this material for thermal and/or acoustic insulation.

14 Claims, No Drawings

INORGANIC FIBRE MATERIAL

BACKGROUND OF THE INVENTION

The invention relates to materials based on inorganic fibres, and especially materials intended to form part of the composition of thermal and/or acoustic insulating products or of soil-less culture media. The invention relates more particularly to the industrial production of glass wool or of rock wool, generally obtained by so-called internal centrifuging fibre-forming techniques.

This type of technique has been, and at present still is, very widely employed for manufacturing fibres which can be generally described as "single-component" (that is to say, in the context of the invention, obtained from a single type of molten inorganic material). Very roughly speaking, internal centrifuging consists of introducing a thin stream of a given molten inorganic substance, of the glass composition type, into a centrifuge, also called fibre-forming dish, which rotates at high speed and is pierced at its periphery with a multitude of orifices through which the molten substance is thrown out in the form of filaments under the effect of centrifugal force. These filaments are next drawn into fibres and entrained towards a collector in order to form a fibre sheet therein, under the effect of an annular high temperature and high speed drawing stream, running along the fibre-forming dish.

To ensure that the fibres collected together form a material, a sizing composition is sprayed onto the fibres as they travel towards the receiver. This composition usually contains a thermosetting resin. The sheet of collected fibres is next subjected to a heat treatment in an oven to cure/crosslink the resin, and thus to obtain a fibrous product exhibiting the desired properties, such as dimensional stability, mechanical tensile strength, regain of thickness after compression or the choice within the densities and thicknesses of the products.

For further details on the technique, reference will be made advantageously, for example, to U.S. Pat. Nos. 4,451,276; 4,756,732; 4,759,785; 4,759,974; 5,176,729; 5,270,434; 5,340,903; and 5,277,706 incorporated herein by reference.

However, attempts have always been made to improve the quality of these products, especially in terms of insulating power, of "volume" or of ability to regain thickness after compression. These properties depend on a number of parameters including the density of the product, the size of the fibres of which it is made up, or the proportion and the distribution of the sizing composition.

An adaptation of the internal centrifuging technique described above was then developed, an adaptation consisting, again very roughly speaking, in feeding each of the orifices in the fibre-forming dish with two thin streams of glass of different chemical compositions. Since the glass compositions are chosen so as to exhibit different thermal expansion coefficients, the fibres obtained are referred to as bi-component fibres. These fibres, on cooling, exhibit great flexibility and a "curvilinear" appearance giving the final product a particularly lofty appearance, particularly "puffed out", with an excellent regain of thickness after compression. Any sizing operation then becomes superfluous or even incompatible with this new technique, which often calls for a heat treatment of the sheet of fibres, once formed on line, at at least 370° C. up to 590° C., temperatures which would degrade the sizing resin beyond its cure by polymerization/crosslinking.

For further details on this fibre-forming technique, starting from a number of inorganic compositions, reference may be made to U.S. Pat. No. 2,998,620 or to the more recent U.S. patent application Ser. Nos. 275,184 filed Jul. 14, 1994 and 148,771 filed Nov. 5, 1993, both of which are incorporated herein by reference.

Furthermore, the fibrous products based on these bi-component fibres exhibit some disadvantages: the very method of obtaining these very special fibres can, in the present state of knowledge, produce only products of low use density, for example of the order of 8 to 10 kg/m$^3$. Now, many applications, both in the field of thermal insulation and of acoustic insulation, require much denser fibrous materials reaching, for example, up to 100 to 110 kg/m$^3$. The other significant disadvantage which needs to be stressed is the fact that, in this case, the geometrical shape of the sheet of fibres which is collected at the exit of the manufacturing line is only very poorly controlled: no dimensional stability is guaranteed, especially insofar as the thickness of the product is concerned. On an industrial scale, the only solution is, in fact, to package these products with the aid of a flexible plastic enclosure, a costly operation and one which is not entirely satisfactory since, while it allows the product to be handled more easily, it does not overcome the problem of the absence of control of the geometry of the final product.

The aim of the present invention is therefore to overcome all these disadvantages, especially by developing a fibrous material which can successfully reconcile the advantages of the fibrous materials based on "single-component" fibres with those of the fibrous materials based on bi-component fibres.

DESCRIPTION OF THE INVENTION

The subject-matter of the invention is a material based on inorganic fibres, at least a proportion of which are multicomponent, especially bi-component fibres. In order to ensure, at least partially the cohesion and/or the geometry of the material, the fibres are sized.

In the context of the invention multicomponent is understood to refer to the fibres obtained by jointly centrifuging a plurality of inorganic compositions exhibiting very particularly different thermal expansion coefficients, with the aid of a fibre-forming dish. The simplest method of producing these "composite" fibres consists in jointly converting two compositions into fibres such that bi-component fibres are obtained.

Choosing to apply size to multicomponent fibres is extremely advantageous from an industrial viewpoint. These fairly special fibrous materials are thereby enabled to retain their intrinsic properties, especially their "puffed out" appearance and their very high recovery of thickness after compression. Sizing also makes it possible to add to these properties other properties which are also extremely important including dimensional stability. The sheets of multicomponent fibres collected at the bottom of the fibre-forming units can be shaped normally by virtue of the presence of the size with which they are impregnated. Products are then finally obtained in the form of pre-cut panels or rolls of wadding which are perfectly capable of being handled as they are, without having to be bagged. In addition the shape, thickness and density of panels or rolls can be chosen in a completely controlled manner. Their precisely defined geometric shape allows them to be assembled in butt-jointed manner so as to obtain, for example, thermal insulation coatings of large surface area which are continuous, without any thermal bridge in the jointing regions. In addition, sizing multicomponent fibres permits the preparation of fibrous materials in a very wide range of densities or weights per unit area, whereas previously materials based on unsized bi-component fibres were restricted to low densities. The invention therefore makes it possible to diversify very widely the applications which hitherto could be envisaged in the case of bi- or multicomponent fibre materials.

However, it is important to stress that choosing to size this type of fibre constitutes a departure which is not obvious, which goes against the actual concept of the processes for forming multicomponent fibres, the development of which was done precisely with a view to dispensing with any sizing. Now it has finally been discovered, within the scope of the present invention, that having "wavy" or curvilinear fibres which therefore have a certain tendency to tangle with each other, cannot completely compensate for or replace the effect of the sizing which truly and effectively ensures the cohesion of the fibrous material.

It is also not self-evident that, if the fibres are impregnated with a size of suitable composition, it becomes possible to increase the density of the materials at will.

The problems that a person skilled in the art could foresee on trying to incorporate a size in multicomponent fibres cannot be overlooked. In fact, as already mentioned, because of their "waviness" these fibres have a characteristic tendency to assemble together so as to form ropes and strings. This is very obvious when an attempt is made, for example, to extract one of them manually from the fibrous material. These "ropes and strings" tend to be created during the actual fibre-formation, that is to say between the lower part of the fibre-forming dish and the collector, such as a collector of the suction conveyor belt type. Spraying a sizing composition at this stage, as would be conventional in the case of single component fibres, could appear to be risky or even capable of being detrimental to the quality of the final fibrous material. Everything actually suggests that the impregnation to the very interior of these ropes and strings would take place with difficulty, and this would result in the ropes and strings being frozen in a matrix of sizing after the latter is cured. Products would therefore have been expected which, finally, would exhibit heterogeneities of appearance and of colour and which would have lost, at least partially, the character of the bi-component fibres.

However, surprisingly, it has turned out that the operation of sizing the multicomponent fibres has not encountered the expected problems: the impregnation of the fibres with the aid of a crown ring for spraying the sizing composition in the usual manner, between the fibre-forming dishes and the receiver was performed correctly, resulting in a product being obtained which was particularly homogeneous in its appearance (that is, completely uniform colouring within the thickness of the fibrous material) and in its mechanical properties (uniform tensile and flexural mechanical strength) and which had not lost the potential "puffed-out" appearance, nor the regain of thickness on compression, which characterize bi-component fibre devoid of sizing.

It is obvious that the invention is not limited to the production of fibrous materials made up solely of sized multicomponent fibres, but also applies to materials which associate fibres of this type with single component fibres.

The multicomponent fibres which are preferred within the scope of the invention have a distribution of their mean diameter which has approximately the form of a Gaussian curve. At least 50% of fibres advantageously have a mean diameter centred on a range of 6 to 10 micrometers, fewer than 10% have a diameter smaller than 4 micrometers and also fewer than 10% have a diameter greater than 13 micrometers. This quite "targeted" distribution is particularly favourable for the uniformity of the properties of the final fibrous products.

The preferred length characteristics of the multicomponent fibres employed in the invention are slightly more tricky to evaluate since, as already mentioned, they tend to form ropes and strings. These ropes and strings are advantageously relatively long, for example at least 30 millimeters, especially of at least 40 to 60 millimeters. It may be noted in this context that, in the end, these ropes and strings do not detract from the performance of the final product and the inventors have not tried to prevent their formation, even though it is usual to consider their presence as a heterogeneity factor. Suitably distributed, the sizing enables these agglomeration phenomena to be counterbalanced by generally maintaining the fibrous material within precise geometric forms, additionally exhibiting a high bonding and tensile strength.

The fibrous materials according to the invention can exhibit very variable densities, especially of between 7 and 110 kg/m$^3$. By virtue of the presence of sizing, high densities are therefore attained, if desired, by then suitably adjusting the proportion of sizing and then by adapting the forming technique, especially using calendering. In a known manner, the adjustment of the weight per unit area of the sheet of fibres which are collected at the bottom of the fibre-forming units can be performed by adapting the operation of the collector which has to remove the sheet of fibres from the fibre-forming zone. In most cases it suffices to make a suitable adjustment to the speed of the suction conveyor belt where this functions as the collector.

The degree of sizing is adjusted as a function of many parameters, most particularly as a function of the density of the desired product or of the desired level of mechanical strength. As a general rule, the fibrous materials according to the invention have a size weight content, relative to the fibres, of at least 1.5%, especially of at least 2% to 20%, and preferably of between 3 and 11%.

The sizing composition usually comprises an aqueous solution including an inorganic or organic binder. The inorganic binder may be based especially on sodium silicate or mono-, di- or trialuminium phosphate. If organic, the binder may be based on thermoplastic or thermosetting resin(s). Latex emulsions and derivatives or copolymers of rubber and/or of polystyrene such as, for example, butadiene-styrene, may be mentioned, for example, as examples of the thermoplastic resin type.

Phenolic resins and/or amino resins are especially preferred thermosetting resins, for example those obtained by a condensation of phenol and formaldehyde and optionally of urea or else of melamine and/or of an amine of the Mannich amine type. An epoxy resin of the glycidyl ether type, used in combination with an amine hardener can also be involved.

The preferred sizing composition consists of an aqueous solution containing at least one thermosetting resin, the water being removed and the resin crosslinked during the subsequent treatment of the fibres in sheet form. After crosslinking, this resin will ensure most of the "bonding" effect of the sizing.

The sizing composition may also contain additives chosen especially from the groups of surface-active agents, of the ionic or nonionic surfactant type, or else lubricating agents of the mineral oil type, diluting agents, colouring agents or even fillers, agents promoting adhesion to the fibres, of the silane or aminosilane type, and catalysts for crosslinking the resin, like ammonium sulphate, this ammonia being used to delay the pregelling of the sizing.

For further details on sizing compositions reference will be made advantageously to U.S. Pat. Nos. 4,663,419 and 4,710,406, which describes a size employing a resin made up of phenol-formaldehyde and urea-formaldehyde condensates which have a free phenol and free formaldehyde content lower than 0.5% and 3% respectively, a dilutability in water, measured at 20° C., of at least 1000%, and a solids content of at least 40%. This resin results from the condensation of formaldehyde and phenol, which are employed in a molar ratio of between 3 and 6, in the presence of a basic catalyst in a quantity corresponding to 12 to 20 moles of OH per 100 moles of initial phenol, at a temperature of between 60° C. and 75° C., preferably at approximately 70° C., into a phenol conversion higher than 98% is obtained and at most for a period not exceeding 90 min, followed by cooling of the reaction mixture, at a rate of the order of 1° C./min to approximately 35° C. and from the condensation of the excess formaldehyde with urea added in a quantity such that the U/P molar ratio is between (F/P–2.55)/2.6 and (F/P–2.55)/0.7 and preferably between (F/P–2.55)/1.8 and (F/P–2.55)/0.8, the introduction of the urea taking place gradually, during the cooling, over a period equal to at least half the period of cooling of the reaction mixture.

Reference can also be made to Patent U.S. Pat. No. 5,025,077, which describes a sizing composition including a thermosetting resin based on melamine, urea and formaldehyde, on urea, optionally one or more sizing additives and, as additional sizing compound, a polymethylolated compound with a functionality equal to at least three. U.S. Pat. No. 5,047,452 may also be mentioned, relating to a size based on an epoxy resin of the water-dispersible glycidyl ether type, an amine hardener whose flashpoint is higher than 180° C. and additives. (in parts calculated per 100 parts of dry resin) including especially 0.1 to 2% of silane and 0 to 15% of a mineral oil, the epoxy resin preferably having a polymerization value lower than 1 and the hardener an NH equivalent molecular mass lower than 100 g. It may also involve a size like that described in-Patent EP-0 480 778, which comprises a resin composed essentially of phenol-formaldehyde (P-F), urea-formaldehyde (U-F) and phenol-formaldehyde-amine (P-F-A) condensates, the amine A being chosen from those which permit a reaction of the Mannich type, like alkanolamines, like monoethanolamine (MEA), diethanolamine (DEA) and cyclic amines like piperidine, piperazine and morpholine.

Furthermore, a subject-matter of the invention is the application of the fibrous material defined above, in various forms, including mats capable of being rolled up for storage and transport before use; precut panels; flocks; shells; and soil-less culture media. "Flocks" within the meaning of the invention are understood to mean mineral wool which is in the form of modules obtained by mechanical treatment of the material and used for blowing in, blowing or pouring. These flocks preferably have a diameter of between 5 and 20 millimeters. (For convenience, the term "diameter" is employed here to quantify the size of the flocks, it being known that the latter are not necessarily exactly spherical).

The mats or panels according to the invention are capable of exhibiting a recovery of thickness, after compression to $\frac{1}{20}$th of their initial thickness for 72 hours, of at least 110%, especially of at least 120% of their "nominal" thickness (that is to say the minimum thickness guaranteed to the final user after decompression). This verifies that the flexibility properties of the multicomponent fibres are broadly preserved.

These fibrous materials advantageously have a thermal conductivity $\lambda$ of approximately 40 to 47 mW·m$^{-1}$·K$^{-1}$ at a density of approximately 14 to 9 kg/m$^3$, especially a thermal conductivity $\lambda$ of approximately 42 to 45 mW·m$^{-1}$·K$^{-1}$ at a density of approximately 12 to 10 kg/m$^3$, which reflects a good thermal insulation performance at a given density. With fibrous materials of higher density, especially of the order to 25 to 35 kg/m$^3$, values of thermal conductivity $\lambda$ of approximately 32 to 36 mW·m$^{-1}$·K$^{-1}$ are attained.

The mats, (which term is hereinafter used to cover the material in a rolled or unrolled form or in pre-cut "panels" obtained from mats of the fibrous materials), can be provided on at least one of their faces with a "mono- or multi-layer" surface coating including, for example, at least one layer for the purpose of decoration, of the glass fibre veil type, which it will be possible to paint. It may also comprise at least one waterproofing layer and/or vaporproofing layer of the metal film type, such as a film of aluminium and/or a plastic film of the polyethylene type. A surface coating associating an aluminium film with a thickness of up to 9 micrometers and a thermally adhesive film made of polyethylene with a weight per unit area lower than 40 g/m$^2$ has been described in U.S. Pat. No. 4,948,660. It is thus possible to cover only one of the faces of the mat panel, for aesthetic reasons or to form a barrier against vapour, but it is not necessary to package it completely.

All the fibrous materials according to the invention can be employed in the field of building construction, especially for thermal and/or acoustic insulation and/or sealing of walls, roofs, attics, false ceilings, floors etc.

These materials are also advantageously employed in other fields, for example means of transport such as motor vehicles, trains, aircraft and boats.

It should be noted that the fibrous materials of the invention lend themselves easily to thermal or acoustic insulation of the vertical walls in buildings without requiring packaging, since the mats and panels cut therefrom have a well-defined geometric shape and are easily handled. On the other hand, fibrous materials which consist only of bi-component fibres devoid of sizing are unsuitable for insulating vertical walls because, even when packaged, the material is essentially "shapeless".

Another subject-matter of the invention is a process for obtaining the fibrous material described above, which comprises the manufacture of multi-component (such as bi-component) fibres by centrifuging inorganic compositions having different expansion coefficients and feeding the compositions simultaneously through a plurality of orifices of a centrifuge, so that multi-component filaments escape therefrom. The filaments are drawn into fibres by a means of the annular peripheral burner type. A sizing composition is sprayed on to the fibres as they travel towards a receiver, the sized fibres are collected on the said receiver in sheet form and the size is then hardened or cured, especially by passing the sheet through an enclosure heated from 100 to at most 300° C., especially to approximately 200° C.

DESCRIPTION OF PREFERRED EMBODIMENTS

The invention will now be described in greater detail with the aid of a nonlimiting example of embodiment of a fibrous material from bi-component fibres.

Before defining the method by which they are obtained, we describe the materials needed for the fibre-forming of bi-component fibres. These glass compositions intended to be melted are chosen so as to have significantly different thermal expansion coefficients. They are chosen, for example, from those described in the abovementioned Patent U.S. Pat. No. 2,998,620.

The sizing composition employed is an aqueous solution containing 10% by weight of the following components:

- a resin based on phenol-formaldehyde and urea-formaldehyde condensates at a concentration of 39%, and diluted in water to 12.5%
- a silane at a concentration of 2%, marketed by Osis under the trade name "A1100", diluted in the water to 0.13%
- urea at a concentration of 40% diluted in water to 10%
- a mineral oil at a concentration of 50% diluted in water to 1.7%, marketed by Mobil Oil Company under the trade-name "Mulrex"
- ammonium sulphate at a concentration of 20%, diluted in water to 1.3%
- aqueous ammonia at a concentration of 20%, diluted in water to 0.5%.

The resin is obtained from phenol and formaldehyde in a molar ratio of formaldehyde to phenol F/P equal to 3.2/1, in the presence of a basic catalyst of the BaO type in a quantity corresponding to 4.5 moles per 100 moles of initial phenol, at a temperature of approximately 60 to 75° C. until a conversion of free phenol of at least 1.0% is obtained.

The manufacture of the fibrous material according to the invention takes place as follows:

In accordance with the principle of "joint" internal centrifuging described especially in U.S. Pat. No. 2,998,620, a continuous fibre-forming dish is fed with a thin stream of a molten glass which has composition A described in this patent and a thin stream of a molten glass which has the composition D described in this patent. Under the effect of the centrifugal force and of the suitable design of the orifices with which the dish is provided, bi-component filaments are ejected from the orifices and then drawn with the aid of an annular burner giving rise to a ring of hot gas under the dish. The fibres thus formed are next impregnated with the sizing composition described above and annular blowers guide the sized fibres on to a suction conveyor belt the speed of which will allow the weight per unit area of the final project to be adjusted. The sheet thus formed is led into an oven at 200° C. provided with endless belts for lower and upper forming, so as to crosslink the resin and to form the sheet to the desired thickness and hence the desired density. The mat typically obtained has a density of 11 kg/m$^3$, a nominal thickness of 80 mm. It is quite clean with rectilinear edges and a sizing content of 4.5% by weight, measured by loss on ignition. It is easily handleable, does not release dust and is uniform in colour.

The distribution of the fibre diameters of the mat was determined by taking a sample of this mat and examining the diameters of the fibres. These are found to be distributed approximately according to a Gaussian curve, with more than 55% of the fibres having a diameter centred on a range from 6 to 10 micrometers, fewer than 10% of the fibres having a diameter smaller than or equal to 3 micrometers and fewer than 5% of the fibres having a diameter greater than 14 micrometers. The mean diameter is 7.5 micrometers and the standard deviation is 3.4 micrometers.

Comparative tests were performed on:

the fibrous mats according to the invention;

a fibrous mat A made from bi-component fibres which are identical with those of the product according to the invention but totally devoid of sizing;

a fibrous mat B made from standard single component fibres obtained by internal centrifuging of conventional glass composition and sized with 4.5% by weight of the same sizing composition as that employed for the mat according to the invention.

The three mats have the same density: 11 kg/m$^3$.

The tests carried out are the following:

measurement of the tensile strength TS, in gf/g, on ring-shaped test pieces drawn by two internal rods, in accordance with ASTM standard C 686-71 T;

measurement of the thickness recovery TR, as a percentage. This measurement consists in compressing a sample of mat perpendicularly to its plane, so as to reduce its thickness to 1/20th of its free initial thickness which is in this case 80 mm. and maintaining this compression for 72 hours. Once the compression is released, the thickness of the sample is measured as a percentage of the so-called "nominal" thickness, 50 mm in this case, which is the minimum thickness that is guaranteed to the user; (in the case of the mat B the measurement was made after compression to 1/15th and not to 1/20th of the initial thickness).

measurement of the thermal conductivity $\lambda$ in mW·m$^{-1}$·K$^{-1}$;

measurement of the permeability to air AP, in rayl/cm, according to ASTM standard C 522;

measurement of the mean diameter, MD, of the constituent fibres of the mats, in micrometers;

measurement of the dimensionless micronaire value M, according to British Standard BS 3181:1968, which consists in determining the rate of flow of air passing through a sample of fibrous material of a given mass, in this case 5 grams, which is placed in a compartment situated in a circuit in which air circulates at a specified pressure.

Table 1 below collates the results of these various tests for the 3 mats:

TABLE 1

|     | Mat according to the invention | Mat A | Mat B |
| --- | --- | --- | --- |
| TS  | 1100 | not significant | 800 |
| TR  | 120 | 125 | 100 |
| $\lambda$ | 43.5 | 43.5 | 43.5 |
| AP  | 3 | 3 | 5 |
| M   | 4 | 4 | 3 |
| MD  | 7.5 | 7.5 | 4 |

The following conclusions can be drawn from this table:

The mat according to the invention accumulates the properties of the mats of type A and of type B. Thus, it offers a high thickness regain, 120%, with a compression ratio which is, however, high, which is very advantageous. The materials according to the invention can therefore be stored and transported in the compressed state, in a minimum volume, without their properties deteriorating once they are decompressed. In particular, the thickness and the bulkiness of the product before compression are recovered. The final user can thus be guaranteed, without any problem, a minimum thickness after decompression, the so-called "nominal" thickness, while very considerable gains in volume reduction during transporting and storing are achieved. It must be stressed that, as a general rule, the standard products of type B, that is to say made from sized single-component fibres, are usually compressed only to a sixth and not a twentieth of their thickness, to have the ability of guaranteeing a given minimum thickness after decompression. (It is obvious that if the choice is made of compressing the mat according to the invention to only a sixth, the TR can then greatly exceed 120%, for example can be at least 135%.)

Furthermore, it can be verified that the mat according to the invention has thermal insulation properties which are at least as good as those of mat B made from standard fibres. Yet, nevertheless, the fibres employed in the mat according to the invention have a mean diameter nearly twice as high as that of the fibres employed in the mat B. It is a point of great advantage to succeed in maintaining the same degree of insulating ability with fibres which are clearly "thicker", because the latter are generally easier to convert into fibres.

The good mechanical performance of the mat according to the invention can also be stressed, when compared with the mats A and B and very particularly when compared with the mat A, the tensile strength of which is not very high.

We claim:

1. Material in the form of a mat or panel based on inorganic fibers at least a proportion of which are bicomponent fibers, characterized in that the fibers of the material are sized and at least are partially associated with each other in the form of ropes and strings with a length of from at least 30 mm to 60 mm and the mat or panel has a thickness recovery after compression to 1/20th of thickness of at least 110%.

2. Material according to claim 1, characterized in that the fibres are obtained by joint drawing, centrifuging of at least two different inorganic compositions exhibiting different thermal expansion coefficients.

3. Material according to claim 2, characterized in that the inorganic compositions are glass compositions.

4. Material according to claim 1 characterized in that it has a density of between 7 and 110 kg/m$^3$.

5. Material according to claim 1, characterized in that it has a proportion by weight of size, relative to the fibres, of at least 1.5%.

6. Material according to claim 5, characterized in that it has a proportion by weight of size, relative to the fibres, of from 2% to 20%.

7. Material according to claim 1, characterized in that the sizing composition includes a thermosetting resin selected from the group consisting of phenol-formaldehyde resins; amino-resins; epoxy resins of the glycidyl ether type in combination with an amine hardener; and mixtures thereof.

8. Material according to claim 1, characterized in that the sizing composition includes a thermoplastic resin.

9. Material according to claim 8, characterized in that the thermoplastic resin is selected from the group consisting of latex, rubber, styrene polymers and mixtures thereof.

10. Material according to claim 1 characterized in that the sizing composition includes an inorganic binder.

11. Material according to claim 10 characterized in that the inorganic binder is selected from the group consisting of sodium silicate, mono-, di-, or trialuminium phosphate and mixtures thereof.

12. Material according to claim 10 characterized in that the sizing composition includes at least one additive, chosen from the group consisting of surface-active agents, lubricating agents, diluting agents, colouring agents, fillers and agents promoting adhesion to the fibres.

13. Material according to claim 1 characterized in that it exhibits a thermal conductivity $\lambda$ of approximately 40 to 47 mW·m$^{-1}$·K$^{-1}$ at a density of approximately 14 to 9 kg/m$^3$.

14. Material according to claim 1 characterized in that it exhibits a thermal conductivity $\lambda$ of approximately 32 to 36 mW·m$^{-1}$·K$^{-1}$ at a density of approximately 25 to 35 kg/m$^3$.

* * * * *